(12) United States Patent
Gish et al.

(10) Patent No.: US 8,922,720 B1
(45) Date of Patent: *Dec. 30, 2014

(54) BACKWARDS-COMPATIBLE DELIVERY OF DIGITAL CINEMA CONTENT WITH EXTENDED DYNAMIC RANGE

(71) Applicant: Dolby Laboratories Licensing Corporation, San Francisco, CA (US)

(72) Inventors: Walter C. Gish, Oak Park, CA (US); Christopher J. Vogt, Laguna Niguel, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/476,512

(22) Filed: Sep. 3, 2014

Related U.S. Application Data

(63) Continuation of application No. 14/363,861, filed as application No. PCT/US2012/068275 on Dec. 6, 2012, now Pat. No. 8,872,981.

(60) Provisional application No. 61/576,141, filed on Dec. 15, 2011.

(51) Int. Cl.
*H04N 9/74* (2006.01)
*H04N 9/77* (2006.01)
*H04N 9/68* (2006.01)
*G06F 13/00* (2006.01)
*G06T 5/00* (2006.01)

(52) U.S. Cl.
CPC *G06T 5/007* (2013.01); *H04N 9/77* (2013.01); *H04N 9/68* (2013.01); *G06T 2200/16* (2013.01); *G06T 2207/10016* (2013.01); *G06T 2207/10024* (2013.01); *G06T 2207/20048* (2013.01); *G06T 2207/20208* (2013.01)

USPC .......................... 348/678; 348/708; 345/590

(58) Field of Classification Search
USPC ................. 348/441, 708, 678, 720, 722, 620; 382/162, 167; 375/240.01, 240.02, 375/240.26, 240.27; 345/589–591; 725/146–148; 709/232–236, 202, 228
See application file for complete search history.

(56) References Cited

U.S. PATENT DOCUMENTS 5,768,535 A   6/1998   Chaddha
6,920,188 B1  7/2005   Walker
(Continued)

FOREIGN PATENT DOCUMENTS

WO   2009/002321   12/2008
WO   2011/075548   6/2011

OTHER PUBLICATIONS

Xu, R. et al "A High Performance JPEG2000 Decoder Based on FPGA According to DCI Specification" Symposium on Photonics and Optoelectronic, Jun. 19-21, 2010, pp. 1-4.

(Continued)

*Primary Examiner* — Victor Kostak

(57) ABSTRACT

A digital cinema signal is encoded to produce a resulting coded digital cinema bitstream. Decoding the resulting coded digital cinema bitstream allows backwards-compatible delivery of digital cinema content. A digital image or video signal is preprocessed to produce two normalized digital image or video signals of differing quality levels and forward and inverse mapping parameters, which relate the normalized digital image or video signals. The preprocessing can be used prior to the encoding of a digital cinema signal to enable backwards-compatible delivery of digital cinema content.

20 Claims, 6 Drawing Sheets

(56) References Cited

U.S. PATENT DOCUMENTS

| | | | |
|---|---|---|---|
| 7,075,460 | B2 | 7/2006 | Apostolopoulos |
| 7,504,968 | B2 | 3/2009 | Wee |
| 7,797,454 | B2 | 9/2010 | Apostolopoulos |
| 8,045,764 | B2 * | 10/2011 | Hamza .................. 382/117 |
| 8,488,846 | B2 * | 7/2013 | Hamza .................. 382/117 |
| 8,743,291 | B2 | 6/2014 | Li |
| 8,788,277 | B2 * | 7/2014 | Vezyrtzis et al. ......... 704/500 |
| 2007/0258641 | A1 | 11/2007 | Srinivasan |
| 2007/0291047 | A1 | 12/2007 | Harville |
| 2007/0291179 | A1 | 12/2007 | Sterling |
| 2007/0291233 | A1 | 12/2007 | Culbertson |
| 2010/0142836 | A1 | 6/2010 | Joshi |
| 2010/0260268 | A1 | 10/2010 | Cowan |
| 2011/0154426 | A1 | 6/2011 | Doser |
| 2011/0188744 | A1 | 8/2011 | Sun |
| 2011/0194618 | A1 | 8/2011 | Gish |
| 2012/0141037 | A1 * | 6/2012 | Sato .................. 382/224 |
| 2013/0076763 | A1 | 3/2013 | Messmer |
| 2013/0120656 | A1 | 5/2013 | Wilson |
| 2013/0148029 | A1 | 6/2013 | Gish |
| 2013/0235072 | A1 | 9/2013 | Longhurst |
| 2013/0314495 | A1 | 11/2013 | Chen |

OTHER PUBLICATIONS

Gao, Y. et al "H.264/Advanced Video Coding (AVC) Backward-Compatible Bit-Depth Scalable Coding" IEEE Transactions on Circuits and Systems for Video Technology, vol. 19, No. 4, Apr. 2009, pp. 500-510.

Baccaglini, E "Robust Distributed Storage of Digital Cinema Contents" 3rd International Conference on Information and Communication Technologies: From Theory to Applications, Apr. 7-11, 2008, pp. 1-6.

Auli-Llinas, F. et al "JPEG2000 Quality Scalability Without Quality Layers" IEEE Transactions on Circuits and Systems for Video Technology, vol. 18, No. 7, Jul. 2008, pp. 923-936.

Mai, Z. et al "Optimizing a Tone Curve for Backward-Compatible High Dynamic Range Image and Video Compression" IEEE Transactions on Image Processing, vol. 20, No. 6, Jun. 2011, pp. 1558-1571.

Liu, S. et al "Bit-Depth Scalable Coding for High Dynamic Range Video" Proc. of Society for Optical Engineering, vol. 6822, No. 2, Jan. 29, 2008, pp. 682200-682201.

Winken, M. et al "Bit-Depth Scalable Video Coding" International Conference on IEEE, Sep. 1, 2007, pp. 1-5.

Ward, G. et al "JPEG-HDR: A Backwards-Compatible, High Dynamic Range Extension to JPEG" Proc. of the Annual ACM Symposium on the Theory of Computing, Jan. 1, 2005, pp. 283-290.

Digital Cinema Initiatives, LLC, "Digital Cinema System Specification" Version 1.2 with Errata as of Aug. 30, 2012 Incorporated, Approved Oct. 10, 2012.

* cited by examiner

US 8,922,720 B1

BACKWARDS-COMPATIBLE DELIVERY OF DIGITAL CINEMA CONTENT WITH EXTENDED DYNAMIC RANGE

CROSS REFERENCE TO RELATED APPLICATIONS

This application is a continuation of U.S. patent application Ser. No. 14/363,861, filed on Jun. 9, 2014, which is the national stage entry for PCT Application Ser. No. PCT/US2012/068275, filed on Dec. 6, 2012, which claims the benefit of priority to U.S. Provisional Patent Application Ser. No. 61/576,141, filed on Dec. 15, 2011, all of which are hereby incorporated by reference in their entirety. The present application is also related to PCT Application PCT/US2011/048861, entitled "Extending Image Dynamic Range", filed on Aug. 23, 2011, which is incorporated herein by reference in its entirety. The present application is also related to PCT Application PCT/US2010/026953 entitled "Layered Compression of High Dynamic Range, Visual Dynamic Range, and Wide Color Gamut Video," filed on Mar. 11, 2010, which is incorporated herein by reference in its entirety.

TECHNICAL FIELD

The present disclosure relates to image processing for digital cinema as well as preprocessing and coding of digital image and/or video content. More particularly, an embodiment of the present invention relates to backwards-compatible delivery of digital cinema content with extended range and related preprocessing and coding methods.

BACKGROUND

As used herein, the term 'dynamic range' (DR) may relate to a capability of the human visual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the HVS. For example, well adapted humans with essentially normal vision (e.g., in one or more of a statistical, biometric or opthamological sense) have an intensity range that spans about 15 orders of magnitude. Adapted humans may perceive dim light sources of a few photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the term 'visual dynamic range' (VDR) may relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR) or standard dynamic range (SDR), in relation to VDR and HDR. Digital cinema systems exhibit some of the same limitations as other display devices.

Advances in their underlying technology, however, will allow future digital cinema systems to render image and video content with significant improvements in various quality characteristics over the same content, as rendered on today's digital cinema systems. For example, future digital cinema systems may be capable of a DR (e.g. VDR) that is higher than the SDR/LDR of conventional digital cinema systems as well as a larger color gamut than the color gamut of conventional digital cinema systems. The challenge is providing digital cinema content which may be displayed on conventional SDR, small color gamut systems at a standard quality level as well as more advanced VDR, larger color gamut systems at a correspondingly higher quality level.

DESCRIPTION OF EXAMPLE EMBODIMENTS

Figure 1A:
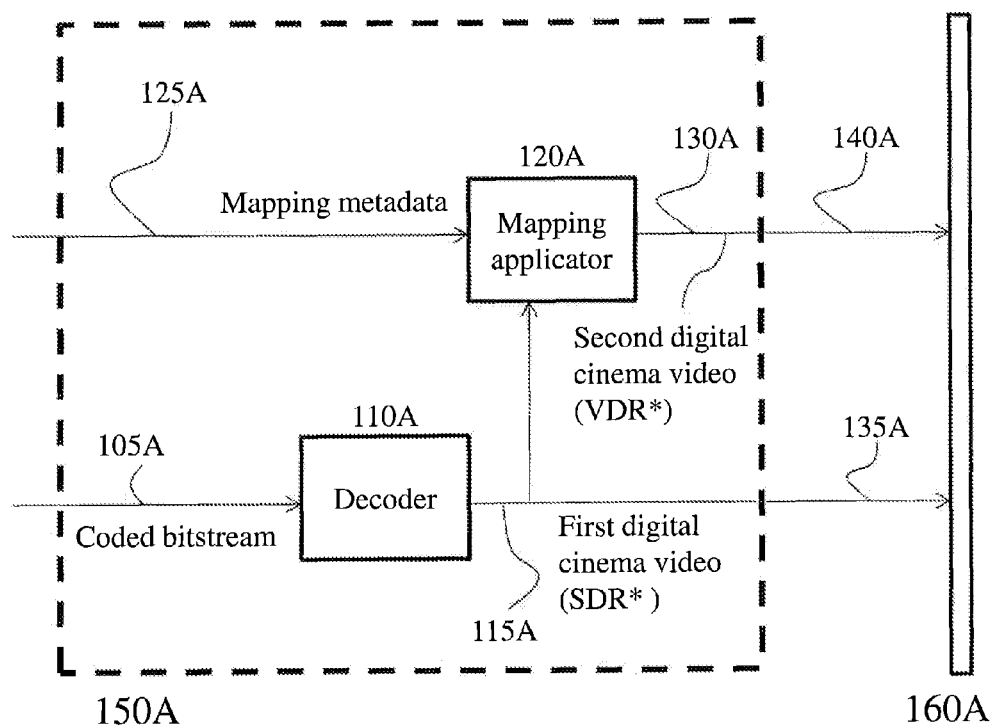
FIGS. 1A and 1B depict schematic diagrams of digital cinema decoding architectures in accordance with exemplary embodiments of the present disclosure.

In an example embodiment, a method of decoding a coded digital cinema bitstream is provided, the method comprising: providing a coded digital cinema bitstream; providing mapping parameters; decoding the coded digital cinema bitstream, the decoding producing a first decoded digital cinema image or video with a first dynamic range and a first color gamut; and expanding the first dynamic range and the first color gamut of the first decoded digital cinema image or video by inverse mapping the first decoded digital cinema image or video with the mapping parameters, thus obtaining a second decoded digital cinema image or video with a second dynamic range higher than the first dynamic range and a second color gamut larger than the first color gamut.

In an example embodiment, a method of decoding a coded digital cinema bitstream is provided, the method comprising: providing a coded digital cinema bitstream; providing mapping parameters; decoding the coded digital cinema bitstream, the decoding producing a first decoded digital cinema image or video with a first dynamic range and a first color gamut; and compressing the first dynamic range and the first color gamut of the first decoded digital cinema image or video by forward mapping the first decoded digital cinema image or video with the mapping parameters, thus obtaining a second decoded digital cinema image or video with a second dynamic range lower than the first dynamic range and a second color gamut smaller than the first color gamut.

In an example embodiment, a method of pre-processing a digital image or video signal is provided, the method comprising: processing the digital image or video signal by performing color grading to produce a first digital image or video signal having a first dynamic range and a first color gamut, and a second digital image or video signal having a second dynamic range and a second color gamut, the second dynamic range being higher than the first dynamic range and the second color gamut being larger than the first color gamut; producing a first normalized digital image or video signal by pre-processing the first digital image or video signal; producing a second normalized digital image or video signal by pre-processing the second digital image or video signal, wherein the first normalized digital image or video signal is obtainable from the second normalized digital image or video signal through a forward mapping and the second normalized digital image or video signal is obtainable from the first normalized digital image or video signal through an inverse mapping; and producing forward mapping parameters and inverse mapping parameters.

In an example embodiment, a method of estimating nonlinear forward mapping parameters for digital image or video signals is presented, the method comprising: providing a first digital image or video signal; providing a second digital image or video signal; providing a matrix; inverting the matrix and applying the inverted matrix to the first digital image or video signal, thus obtaining an intermediate digital image or video signal; and producing nonlinear transformation parameters corresponding to a nonlinear transformation between the second digital image or video signal and the intermediate digital image or video signal.

In an example embodiment, a method of estimating matrix forward mapping parameters for digital image or video signals is presented, the method comprising: at the providing a first digital image or video signal; providing a second digital image or video signal; providing a nonlinear transformation; applying the nonlinear transformation to the second digital image or video signal, thus obtaining an intermediate digital image or video signal; and producing matrix transformation parameters corresponding to a matrix transformation between the intermediate digital image or video signal and the first digital image or video signal.

In an example embodiment, a method of determining forward mapping parameters for digital image or video signals is presented, the method comprising: (a) setting an input matrix equal to an identity matrix; (b) providing a first digital image or video signal; (c) providing a second digital image or video signal; (d) inverting the input matrix, thus obtaining an inverted matrix and applying the inverted matrix to the first digital image or video signal, thus obtaining an intermediate first digital image or video signal; (e) producing nonlinear transformation parameters corresponding to a nonlinear transformation between the second digital image or video signal and the intermediate first digital image or video signal; (f) applying the nonlinear transformation parameters to the second digital image or video signal, thus obtaining an intermediate second digital image or video signal; (g) producing an estimated matrix corresponding to a matrix transformation between the intermediate second digital image or video signal and the first digital image or video signal; (h) repeating steps (d) through (g), wherein the input matrix of step (d) is set equal to the estimated matrix of step (g); and (i) iterating step (h) until a desired result is obtained.

In an example embodiment, a method of determining forward mapping parameters for digital image or video signals is presented, the method comprising: (a) setting input nonlinear transformation parameters to identity; (b) providing a first digital image or video signal; (c) providing a second digital image or video signal; (d) applying the input nonlinear transformation parameters to the second digital image or video signal, thus obtaining an intermediate second digital image or video signal; (e) producing a matrix corresponding to a matrix transformation between the intermediate second digital image or video signal and the first digital image or video signal; (f) inverting the matrix and applying the inverted matrix to the first digital image or video signal, thus obtaining an intermediate first digital image or video signal; (g) producing estimated nonlinear transformation parameters corresponding to a nonlinear transformation between the second digital image or video signal and the intermediate first digital image or video signal; (h) repeating steps (d) through (g), wherein the input nonlinear transformation parameters of step (d) are set equal to the estimated nonlinear transformation parameters of step (g); and (i) iterating step (h) until a desired result is obtained.

In an example embodiment, a system configured to decode a coded digital cinema bitstream is presented, the system comprising: a decoder configured to decode the coded digital cinema bitstream and produce a first decoded digital cinema image or video; and a mapping applicator configured to expand a first dynamic range and a first color gamut of the first decoded digital cinema image or video by inverse mapping the first decoded digital cinema image or video with mapping parameters, thus obtaining a second decoded digital cinema image or video with a second dynamic range higher than the first dynamic range and a second color gamut larger than the first color gamut.

In an example embodiment, a system configured to decode a coded digital cinema bitstream is provided, the system comprising: a decoder configured to decode the coded digital cinema bitstream and produce a first decoded digital cinema image or video; and a mapping applicator configured to compress a first dynamic range and a first color gamut of the first decoded digital cinema image or video by forward mapping the first decoded digital cinema image or video with mapping parameters, thus obtaining a second decoded digital cinema image or video with a second dynamic range lower than the first dynamic range and a second color gamut smaller than the first color gamut.

In an example embodiment, a system configured to pre-process a digital image or video signal is provided, the system comprising: a color grading module configured to process the digital image or video signal to produce a first digital image or video signal having a first dynamic range and a first color gamut, and a second digital image or video signal having a second dynamic range and a second color gamut, the second dynamic range being higher than the first dynamic range in the second color gamut being larger than the first color gamut; and a preprocessor configured to produce a first normalized digital image or video signal by preprocessing the first digital image or video signal; configured to produce a second normalized digital image or video signal by preprocessing the second digital image or video signal, wherein the first normalized digital image or video signal is obtainable from the second normalized digital image or video signal through a forward mapping and the second normalized digital image or video signal is obtainable from the first normalized digital image or video signal through an inverse mapping; and configured to produce forward mapping parameters and inverse mapping parameters.

As used herein, the term digital cinema refers to the projection of a theatrical motion picture through a digital cinema projection system. As used herein, the term digital cinema signal refers to a signal representing digital cinema information.

As used herein, the terms digital image or video signal refer to digital content which may be, by way of example and not of limitation, live action, rendered CGI (computer-generated imagery), or from any source capable of producing a digital image or video signal.

FIG. 1A depicts a schematic diagram of a digital cinema decoding architecture in accordance with an embodiment of the present disclosure.

A coded bitstream (105A) is input to a decoder (110A). In the embodiment of the figure, the bitstream comprises a 12-bit digital cinema signal with a 4:4:4 color representation. Typical input bit rates are in the 125-250 Mbps range. The digital cinema signal has a dynamic range, e.g. a 2000:1 dynamic range, and a color gamut, e.g. a P3 color gamut. The decoder (110A) can be any decoder able to operate on a digital cinema signal, e.g. a JPEG-2000 decoder.

The decoder (110A) outputs a first digital cinema image or video (115A) with the same dynamic range and color gamut of the coded input bitstream (105A).

Inverse mapping is performed on the digital cinema image or video (115A) by a mapping applicator (120A) to expand the dynamic range and color gamut of the image or video. In accordance with an embodiment of the disclosure, the inverse of a nonlinear transformation N followed by a matrix transformation M, i.e. $(M \circ N)^{-1}$ (where the ∘ indicates the transformation on the right is carried out prior to the transformation on the left), is performed. By way of example, the nonlinear transformation N can be a six segment, cubic spline, while matrix M can be a 3×3 matrix. The nonlinear transformation parameters Nj and matrix parameters Mij are sent to the mapping applicator (120A) as mapping metadata (125A). In one embodiment, the mapping applicator can be implemented as a three-dimensional (3-D) lookup table. While 3-D lookup tables in general are known to those skilled in the art, an embodiment according to the present disclosure may use the 3-D lookup table to produce VDR digital cinema video.

The mapping applicator (120A) outputs a second 12-bit, 4:4:4 digital cinema image or video (130A) with a higher dynamic range and a larger color gamut than the dynamic range and color gamut of the first digital cinema image or video (115A). For example, the second digital cinema image or video (130A) can have a 10000:1 dynamic range, and a color gamut larger than P3.

Therefore, the decoding architecture of FIG. 1A provides a dual-layered digital cinema content. In particular, the output (135A) of the first layer provides a 12-bit, 4:4:4 digital cinema signal (115A) with a first dynamic range and first color gamut, while the output (140A) of the second layer provides a 12-bit, 4:4:4 digital cinema signal (130A) with a second dynamic range higher than the first dynamic range and a second color gamut larger than the first color gamut.

The architecture of FIG. 1A thus provides a 'single inventory', backwards-compatible, approach for digital cinema content, which can be used both with (a) digital cinema projectors compatible with the first dynamic range and the first color gamut and (b) digital cinema projectors compatible with the second dynamic range and second color gamut. Output (135A) will be sent to the first type of projectors, while output (140A) will be sent to the second type of projectors. Alternatively, decoder (110A) and mapping applicator (120A) may be located in a projector (150A) and one of the outputs (135A, 140A) can be sent to a screen (160A).

The person skilled in the art will appreciate that the decoding and mapping architecture of FIG. 1A is a residual-free architecture, where no residual is employed to improve decoding of the digital cinema bitstream (105A).

In one embodiment, the output (135A) represents a conventional/LDR/SDR digital cinema version, while the output (140A) represents a VDR/HDR digital cinema version. As mentioned above, use of the LDR/SDR or VDR/HDR version will depend on the kind of projector available to theatres.

Figure 1B:
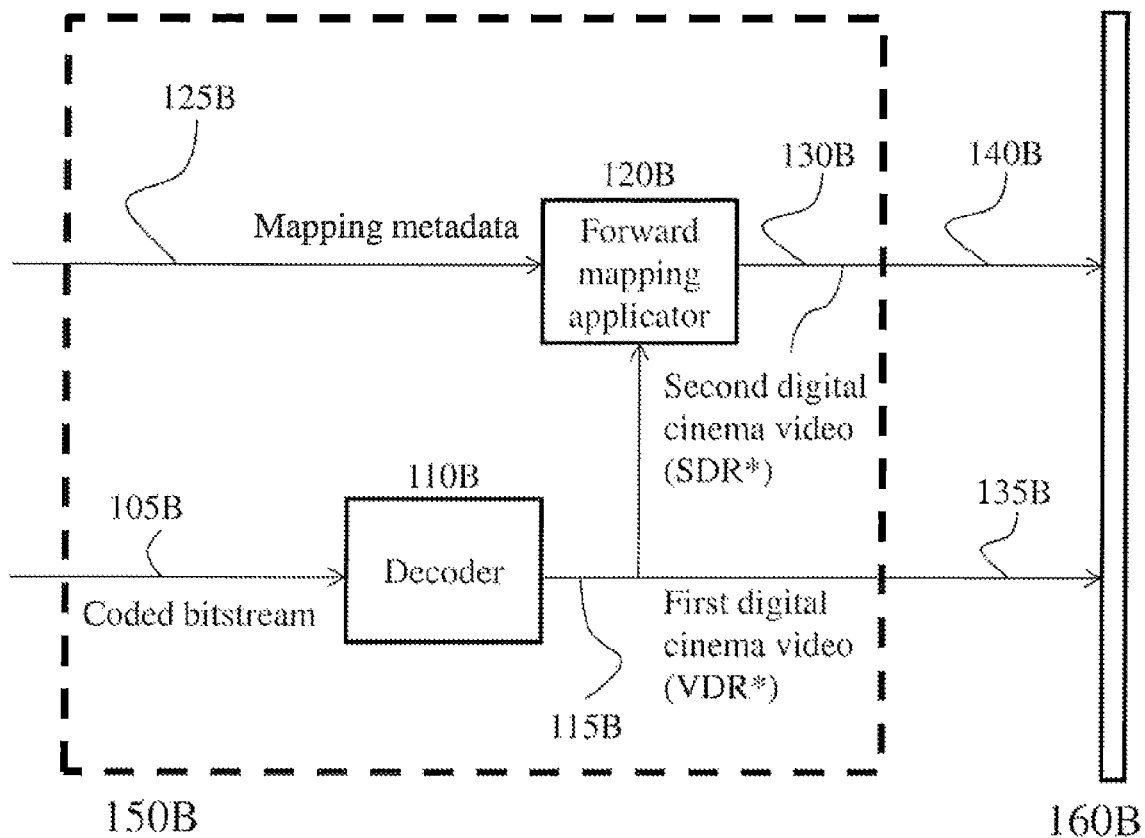

FIG. 1B depicts a schematic diagram of a digital cinema decoding architecture in accordance with an alternative embodiment of the present disclosure. Such architecture is similar to the embodiment of FIG. 1A with the following differences. Coded bitstream (105B) of FIG. 1B is characterized by a higher dynamic range and a larger color gamut than coded bitstream (105A) of FIG. 1A. First digital cinema video (115B) is sent to forward mapping applicator (120B) to produce a second digital cinema video (130B) with a lower dynamic range and a smaller color gamut than the first digital cinema video (115B).

In one embodiment, the output (135B) represents a VDR/HDR digital cinema version, while the output (140B) represents a conventional/LDR/SDR digital cinema version. As mentioned above, use of the LDR/SDR or VDR/HDR version will depend on the kind of projector available to theatres.

While the dual-layer architectures of FIGS. 1A and 1B have been described in terms of conventional/SDR layer vs. VDR/HDR layer, the person skilled in the art will understand that other layered forms and denominations are also possible, such as base layer vs. enhancement layer, first enhancement layer vs. second enhancement layer, and so on.

Figure 2:
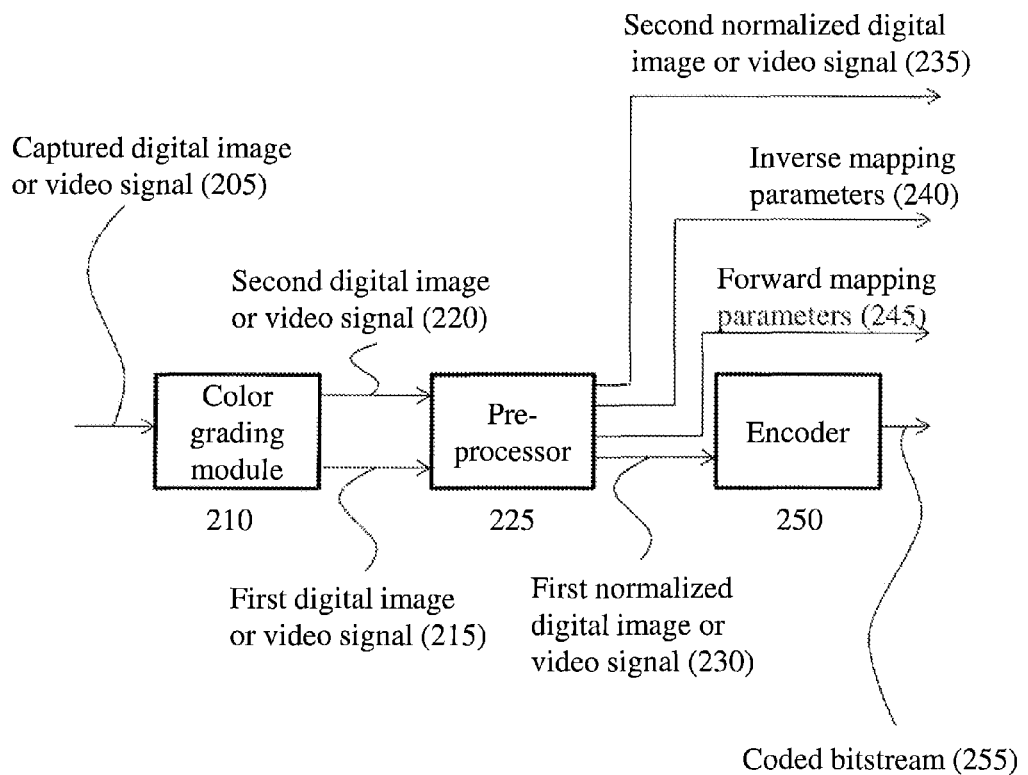
FIG. 2 is an example of a pre-processing architecture of a digital image or video prior to coding.

As noted above, FIG. 1A depicts details of a decoding architecture of a digital cinema bitstream. FIG. 2 depicts instead an example of a pre-processing architecture of a digital cinema image or video prior to coding. In a particular embodiment of the present disclosure, the pre-processing architecture of FIG. 2 can be used in combination with the decoding architecture of FIG. 1A.

As depicted in FIG. 2, a captured digital cinema signal (205) is input to a color grading module (210), which outputs a first digital cinema signal (215) with a first dynamic range and color gamut and a second digital cinema signal (220) with a second dynamic range higher than the first dynamic range and a second color gamut larger than the first color gamut. By way of example, signal (215) can be an LDR/SDR signal, while signal (220) can be a VDR/HDR signal.

The first digital cinema signal (215) and second digital cinema signal (220) are then normalized in a preprocessor (225), thus producing a first normalized digital cinema signal (230) and a second normalized digital cinema signal (235), where the second normalized digital cinema signal (235) is identical to the second digital cinema signal (220). The processing through the preprocessor (225) allows the first normalized digital cinema signal (230) and the second normalized digital cinema signal (235) to be related by invertible mapping. In other words, once normalized, digital cinema signal (230) can be obtained from digital cinema signal (235) through forward mapping, while digital cinema signal (235) can be obtained from digital cinema signal (230) through inverse mapping. Assuming, for example, that the first signal (230) is indicated by SDR* (where * is to indicate a normalized version of input (215)) and the second signal (235) is indicated by VDR* (which is usually equal to the VDR input (220) to numerical precision), the following relationship holds true: $SDR^* = (M \circ N)VDR^*$, where $M \circ N$ is the forward mapping operator mentioned above. The preprocessor (225) also produces inverse and/or forward mapping parameters (240) and/or (245) to be sent, e.g., as metadata. Such parameters allow obtaining signal (235) from signal (230) through inverse mapping or signal (230) from signal (235) through forward mapping. The mapping parameters obtained and the mapping performed are such that inverse mapping the SDR* signal will exactly reproduce the VDR signal.

Figure 3:
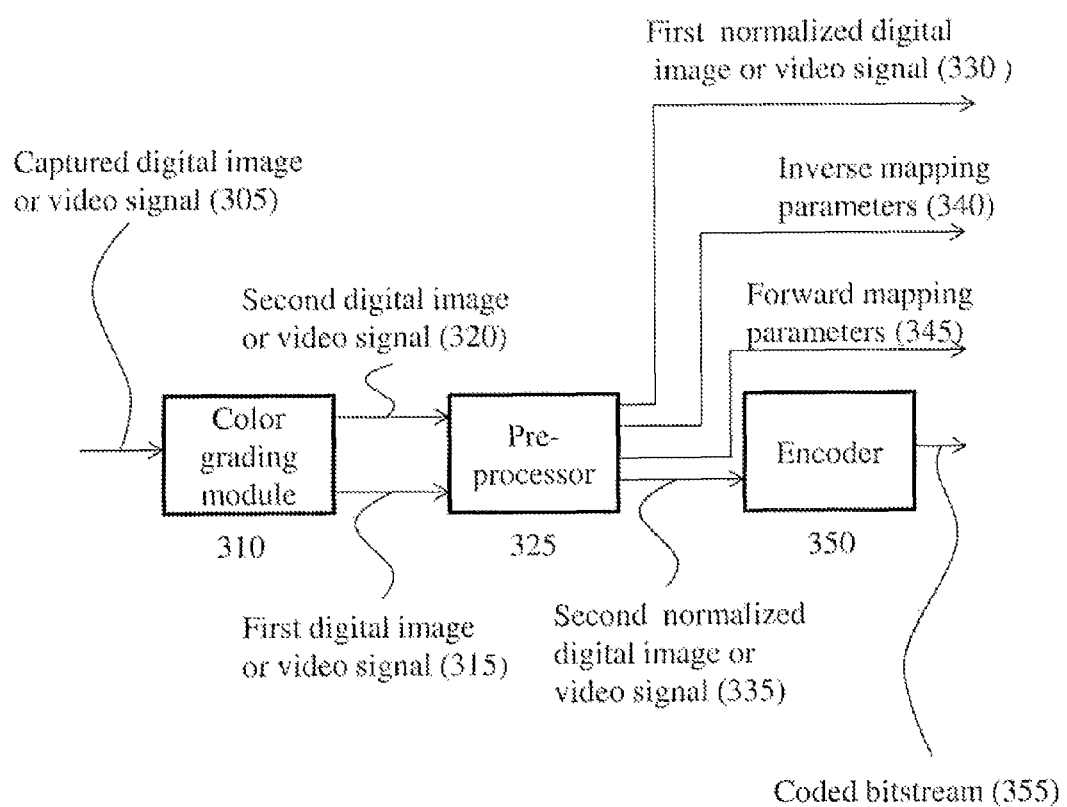
FIG. 3 is an alternative example of a pre-processing architecture of a digital image or video prior to coding.

The first normalized digital cinema signal (230) is then encoded in an encoder (250) and sent to a digital cinema system as a coded bitstream (255). Encoder (250) can be, for example, an encoder configured to process the first signal (e.g., an SDR* signal (230)) and not the second signal (e.g., a VDR* signal (235)). See, for example, encoder 312 in FIG. 9A of the above mentioned PCT Application PCT/US2011/048861, incorporated herein by reference in its entirety. In an alternative embodiment, the second signal (e.g., a VDR* signal (335)) may be encoded to allow obtaining an SDR* signal from a VDR* signal. This alternative embodiment is depicted in FIG. 3. Such embodiment can be combined with FIG. 1B in a manner similar to the combination of FIGS. 2 and 1A.

Normalization pre-processing as described in FIGS. 2 and 3 can be used to prepare image or video data for backwards-compatible delivery in distribution systems such as digital cinema systems. As noted above, compatibility between the first and the second digital signals discussed above is obtained at the output of the preprocessor (225/325), where an SDR* signal can be obtained from a VDR* signal and vice versa. In other words, the embodiments of FIGS. 2-3 allow different realizations (various levels of SDR) of a master image or video (e.g., VDR) to be derived by transforming the master image or video with a transformation that is invertible.

According to the embodiment described above, one such transformation is the M∘N transformation. In other words, a non-linear transformation N followed by a linear matrix transformation M are performed. Such transformation (where repeated indices imply summation and where the higher and lower dynamic range indicators are depicted as VDR and SDR by way of example) can be seen as follows:

$$C_i^{VDR} = \text{i-th color component of VDR image} \quad \text{Equation (1)}$$
$$C_i^{SDR} = \text{i-th color component of SDR image}$$
$$C_i^{SDR} = M_{i,j} N_j [C_j^{VDR}] = \sum_j M_{i,j} N_j [C_j^{VDR}]$$

When the N and M transformation are invertible, the VDR image or video can be recovered from the SDR image or video:

$$C_i^{VDR} = N_i^{-1}[M_{i,j}^{-1} C_j^{SDR}] = N_i^{-1}\left[\sum_j M_{i,j}^{-1} C_j^{SDR}\right] \quad \text{Equation (2)}$$

In practice, SDR and VDR images or videos are often created in separate color grading passes. The SDR version typically satisfies Equation (1) approximately, but not necessarily exactly. The function of normalization is to determine a modified version of the SDR, i.e. SDR*. SDR* and the original VDR satisfy Equation (1) exactly and, furthermore, SDR* and SDR are typically indistinguishable visually. SDR and SDR* can be visually indistinguishable approximately 99% of the time, and in cases where there are visible differences, such differences can be visible only when the sequence is halted at a particular frame.

In an embodiment of the present disclosure, input bitstream (105A) of FIG. 1A corresponds to the encoded bitstream (255) of FIG. 2, while mapping metadata (125A) of FIG. 1A correspond to inverse mapping parameters (240) of FIG. 2. Therefore, according to such embodiment, the decoding architecture of FIG. 1A can be used in conjunction with the encoding architecture of FIG. 2. In particular, assuming that the inverse mapping of FIG. 1A is performed by inverse transformation (M∘N)$^{-1}$, the mapping of FIG. 2 is performed by transformation M∘N as later explained in greater detail. Similarly, the encoding architecture of FIG. 3 can be used with alternative decoding architectures based on that depicted in FIG. 1B. Input bitstream (105B) of FIG. 1B corresponds to the encoded bitstream (355) of FIG. 3, while mapping metadata (125B) of FIG. 1B correspond to forward mapping parameters (345) of FIG. 3.

Figure 4:
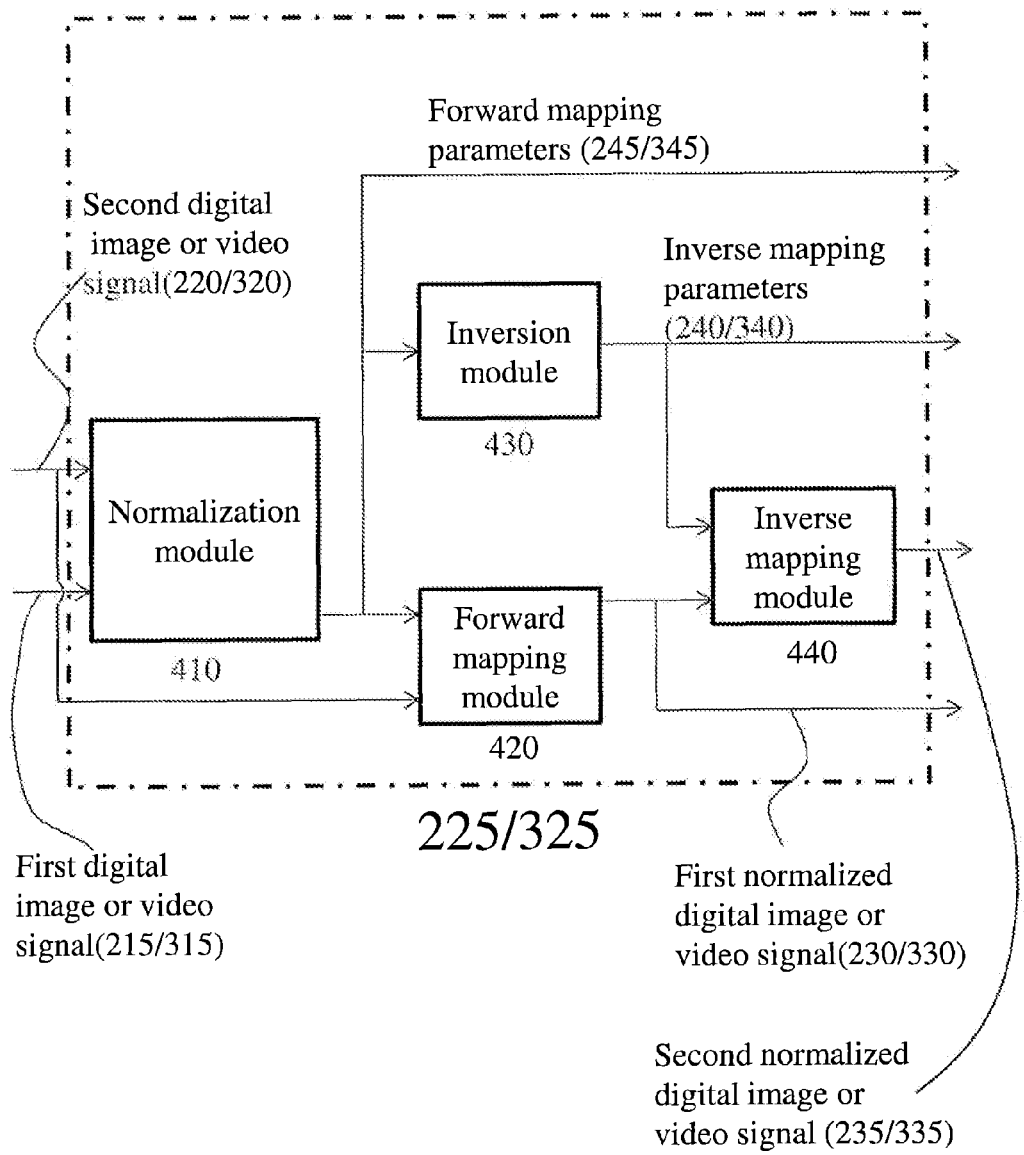
FIG. 4 depicts a schematic representation of an embodiment of the preprocessor of FIGS. 2-3 in greater detail.

Reference will now be made to FIG. 4, which depicts a schematic representation of an embodiment of the preprocessor (225/325) of FIGS. 2 and 3 in greater detail. First signal (215/315) and second signal (220/320) are sent to a normalization module (410) which determines the forward mapping parameters of nonlinear transformation N$_j$[ ] and the forward mapping parameters M$_{ij}$ of matrix transformation M. An example of how these parameters are obtained will be later explained in detail.

Such forward mapping parameters (245/345) are input to a forward mapping module (420) together with the second signal (220/320) in order to obtain the first normalized digital cinema signal (230/330) discussed with reference to FIGS. 2 and 3, e.g. an SDR* signal. Forward mapping parameters (245/345) are also input to an inversion module (430) to obtain inverse mapping parameters (240/340). Such inverse mapping parameters (240/340) are input to an inverse mapping module (440) to obtain the second normalized digital cinema signal (235/335) of FIGS. 2 and 3.

The parameters for N and M can be first estimated from the original data. By way of example, such parameters can be determined iteratively using two routines "EstimateN" and "EstimateM" that estimate N or M while the other is fixed:
    N=EstimateN[VDR, SDR, M]
    M=EstimateM[VDR, SDR, N]

As mentioned above, N can be modeled as a piecewise polynomial such as a piecewise cubic spline with typically 5-6 segments, while M can be a 3×3 matrix.

The routine EstimateN[ ] inverts the matrix M and applies that to the SDR image or video. N is then the transformation between VDR and M$^{-1}$·SDR. Similarly, the routine EstimateM[ ] applies the non-linear transformation to VDR and then M is the transformation between N[VDR] and SDR. Thus, there are two estimation sequences, depending upon whether N or M is first estimated:

Sequence A:
        Set M$^0$=I; (identity)
        N$^0$=EstimateN[VDR, SDR, M$^0$];
        M$^1$=EstimateM[VDR, SDR, N$^0$];
        N$^1$=EstimateN[VDR, SDR, M$^1$];
        M$^2$=EstimateM[VDR, SDR, N$^1$];
        . . . iterate until a desired result is obtained, e.g. mathematical convergence.
    Sequence B:
        Set N$^0$=I; (identity)
        M$^0$=EstimateM[VDR, SDR, N$^0$];
        N$^1$=EstimateN[VDR, SDR, M$^0$];
        M$^1$=EstimateM[VDR, SDR, N$^1$];
        N$^2$=EstimateN[VDR, SDR, M$^1$];
        . . . iterate until a desired result is obtained, e.g. mathematical convergence.

Other methods for determining N and M can also be used, such as software optimization packages (e.g. MATLAB).

Figure 5:
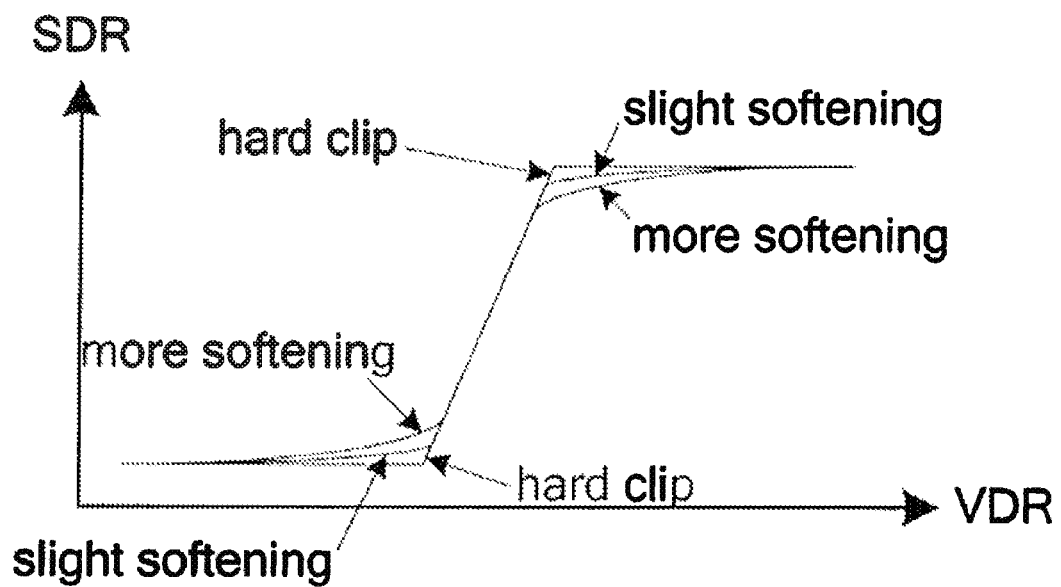
FIG. 5 depicts a typical non-linearity when clipping occurs at both the low and high limits of intensity.

In most cases the parameters for N[ ] and M determined as described above are sufficient. In some cases, the non-linearity must be slightly modified due to the so-called "clipping" in the SDR signal. FIG. 5 depicts a typical non-linearity when clipping occurs at both the low and high limits of intensity. In order to make N[ ] invertible, the clipping should be softened. FIG. 5 depicts varying degrees of softening. The greater the softening the larger the differences between SDR and SDR* for the clipped pixels, so the desire to maintain visual equivalence between SDR and SDR* constrains this softening.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the backwards-compatible delivery of digital cinema content with extended range and related preprocessing and coding methods of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A method of decoding a coded digital bitstream (255), wherein the coded digital bitstream (255) comprises a coded digital image (105A, 105B) and mapping metadata (125A, 125B), the method comprising:

decoding the coded digital bitstream with a decoder (110A, 110B) to generate a first normalized digital image (115A, 115B) with a first dynamic range; and applying (120) the mapping metadata to the first normalized digital image to generate a second normalized digital cinema image (130A, 130B) with a second dynamic range, wherein the mapping metadata comprise an invertible mapping between the first and the second normalized digital images, wherein the invertible mapping comprises an invertible nonlinear transformation and an invertible matrix transformation.

2. The method of claim 1, wherein the first dynamic range is lower than the second dynamic range and generating the second normalized digital image (130A) using the first normalized digital image (115A) and the invertible mapping comprises:

applying the inverse matrix transformation to the first normalized image to generate a first result; and applying the inverse of the nonlinear transformation to the first result to generate the second normalized digital image.

3. The method of claim 1, wherein the first dynamic range is higher than the second dynamic range and generating the second normalized digital image (130B) using the first normalized digital image (115B) and the invertible mapping comprises:

applying the nonlinear transformation to the first normalized image to generate a first result; and applying the matrix transformation to the first result to generate the second normalized digital image.

4. The method of claim 2, wherein generating in an encoder the first normalized digital image (SDR*) using the second normalized digital image (VDR*) and the invertible mapping comprises:

applying the nonlinear transformation to the second normalized image (VDR*) to generate a second result; and applying the matrix transformation to the second result to generate the first normalized digital image (SDR*).

5. The method of claim 3, wherein generating in an encoder the first normalized digital image (VDR*) using the second normalized digital image (SDR*) and the invertible mapping comprises:

applying the nonlinear transformation to the second normalized image to generate a second result; and applying the matrix transformation to the second result to generate the first normalized digital image.

6. The method of claim 1, further comprising generating an output digital image with the second dynamic range from the second normalized digital image without using any residual image data.

7. The method of claim 1, wherein the nonlinear transformation comprises a six segment, cubic spline.

8. The method of claim 1, wherein the matrix transformation comprises a 3×3 matrix.

9. The method of claim 1, wherein the mapping metadata comprise a three-dimensional lookup table.

10. The method of claim 2, wherein generating the second normalized digital image comprises computing $$C_i^{VDR} = N_i^{-1}[M_{i,j}^{-1} C_j^{SDR}] = N_i^{-1}\left[\sum_j M_{i,j}^{-1} C_j^{SDR}\right],$$

wherein $C_i^{VDR}$ denotes the i-th color component of the second normalized digital image, $C_i^{SDR}$ denotes the i-th color component of the first normalized digital image, $N_i^{-1}[\ ]$ denotes the inverse of the nonlinear transformation $N_i[\ ]$, and $M^{-1}$ denotes the inverse of the matrix transformation M.

11. The method of claim 3, wherein generating the second normalized digital image comprises computing $$C_i^{SDR} = M_{i,j} N_j [C_j^{VDR}] = \Sigma_j M_{i,j} N_j [C_j^{VDR}],$$

wherein $C_i^{VDR}$ denotes the i-th color component of the first normalized digital image, $C_i^{SDR}$ denotes the i-th color component of the second normalized digital image, $N_i[\ ]$ denotes the nonlinear transformation, and M denotes the matrix transformation.

12. A method to generate a coded bitstream (255), wherein the coded digital bitstream comprises a coded digital image (230, 235) and mapping metadata (240, 245), the method comprising:
  receiving an input image (205);
  generating (210) using the input image a first digital image (215) having a first dynamic range;
  generating (210) using the input image a second digital image (220) having a second dynamic range, the second dynamic range being higher than the first dynamic range;
  producing a first normalized digital image (230) and a second normalized digital image (235) by pre-processing the first digital image and the second digital image, wherein the first normalized digital image and the second normalized image are inter-related via an invertible mapping that comprises an invertible nonlinear transformation and an invertible linear matrix transformation; and
  generating the coded bitstream (255) based on the first or second normalized digital image and metadata related to the invertible mapping.

13. The method of claim 12, wherein generating the first normalized digital image using the second normalized digital image and the invertible mapping comprises:
  applying the nonlinear transformation to the second normalized image to generate a first result; and
  applying the matrix transformation to the first result to generate the first normalized digital image.

14. The method of claim 12, wherein generating the second normalized digital image using the first normalized digital image and the invertible mapping comprises:
  applying the inverse matrix transformation to the first normalized image to generate a second result; and
  applying the inverse of the nonlinear transformation to the second result to generate the second normalized digital image.

15. The method of claim 12, wherein the coded bitstream comprises a coded representation of the first normalized digital image (230) and inverse mapping parameters.

16. The method of claim 12, wherein the coded bitstream comprises a coded representation of the second normalized digital image (235) and forward mapping parameters.

17. The method of claim 12 wherein the invertible mapping is expressed as a forward mapping, wherein the first normalized digital image is generated by applying the forward mapping to the second normalized digital image.

18. The method of claim 12 wherein the invertible mapping is expressed as an inverse mapping, wherein the second normalized digital image is generated by applying the inverse mapping to the first normalized digital image.

19. The method of claim 17, wherein parameters for the forward mapping comprise parameters for the invertible nonlinear transformation and parameters for the invertible linear matrix transformation.

20. The method of claim 18, wherein parameters for the inverse mapping comprise parameters for the invertible nonlinear transformation and parameters for the invertible linear matrix transformation.

\* \* \* \* \*